United States Patent
Huang (10) Patent No.: US 9,631,772 B1
(45) Date of Patent: Apr. 25, 2017

(54) READY-TO-STOP ELEVATION CARRIER PLATFORM

(71) Applicant: Ming Hua Huang, Kaohsiung (TW)

(72) Inventor: Ming Hua Huang, Kaohsiung (TW)

( * ) Notice: Subject to any disclaimer, the term of this patent is extended or adjusted under 35 U.S.C. 154(b) by 0 days.

(21) Appl. No.: 15/260,331

(22) Filed: Sep. 9, 2016

(51) Int. Cl.
*F16M 11/00* (2006.01)
*F16M 13/02* (2006.01)

(52) U.S. Cl.
CPC ..... *F16M 13/022* (2013.01); *F16M 2200/027* (2013.01)

(58) Field of Classification Search
CPC .. F16M 13/022; F16M 2200/027; A47F 3/002
See application file for complete search history.

(56) References Cited

U.S. PATENT DOCUMENTS

| | | | | |
|---|---|---|---|---|
| 6,361,131 B1 * | 3/2002 | Powell, Jr. | ............. | A47B 46/00 187/254 |
| 6,802,576 B2 * | 10/2004 | Shepherd | ................ | A47F 3/002 312/114 |
| 7,679,888 B2 * | 3/2010 | Kirschner | ............ | A47B 81/064 312/7.2 |
| 8,047,619 B2 * | 11/2011 | Amstutz | ................ | A47F 3/002 312/117 |

* cited by examiner

*Primary Examiner* — Amy Sterling
(74) *Attorney, Agent, or Firm* — Leong C. Lei (57) ABSTRACT

A ready-to-stop elevation carrier platform includes an inner frame, an outer frame, and a support correction mechanism. The inner frame includes two cam plates and two primary support springs. The outer frame is arranged outside the inner frame and is vertically movable in a linear way. The outer frame and the support correction mechanism are rotatably coupled to each other and the support correction mechanism is arranged, in a rotatable manner, between the two cam plates of the inner frame. The support correction mechanism includes a four bar linkage that is rotatably coupled to the two cam plates of the inner frame. The support correction mechanism includes two secondary support springs. The outer frame is movable in unison with the support correction mechanism for ascending and descending. Due to the spring forces of the primary and secondary support springs, a display device mounted to the outer frame can be supported.

1 Claim, 7 Drawing Sheets

READY-TO-STOP ELEVATION CARRIER PLATFORM

(A) TECHNICAL FIELD OF THE INVENTION

The present invention relates generally to a shower component assembly, and more particularly to a pressure balance valve of an internal retention structure.

(B) DESCRIPTION OF THE PRIOR ART

To achieve stability and easiness of installation and mounting a display device (which can be for example a display, a whiteboard, a blackboard, or other flat panel electronic products), a cabinet or the like is provided for receiving and supporting the display device on a top thereof, or alternatively, a suspension arm or a support arm is provided for suspending a display device thereon for easy viewing and use. However, the support cabinet is generally not structured for changing a vertical location of the display device thereon for better viewing, while the suspension arm or support arm needs an expanded space for operation to change the vertical location of the display device mounted thereto. The support cabinet or the suspension arm or support arm, although being effective to support a display device mounted thereon, suffers inconvenience of operation.

To cope with the above problem, an elevation support frame, which is disclosed in Taiwan Utility Model M462549, is provided, comprising a ground rack on which a transmission mechanism and a mount movement mechanism are provided, wherein the transmission mechanism comprises a transmission roller, idlers, and a spring. The transmission roller is provided with a spiral section. The mount movement mechanism is provided for receiving a display device to be mounted thereto. The mount movement mechanism comprises a transmission wire and the transmission wire is wrapped around the transmission roller and the idlers of the transmission mechanism and is rotatably coupled to the spring. As such, when an operation is conducted for elevating or lowering the display device, the transmission roller is caused to rotate to stretch the spring for achieving a condition of force balance whereby an effect of stopping or positioning in a stepless way can be achieved.

Although the above-described known elevation support frame provides an effect of stopping or positioning in a stepless manner for allowing the elevation support frame to hold and position the device mounted thereto at any desired location in a stepless manner, the ground rack, the transmission mechanism, and the mount movement mechanism are generally of complicated structures, of which assembly and installation can only be done with at least two operators. Further, due to the spiral section provided on and projecting from a rear side of the transmission roller, the size of the elevation support frame is inevitably increased and the overall thickness is also relatively great when viewed from a lateral side, making it impossible to be mounted on a wall. Again, inconvenience and unnecessary limits are found in the use thereof.

SUMMARY OF THE INVENTION

An object of the present invention is to provide an elevation carrier platform that has a reduced size, is easy to operate, and is ready to stop at any desired location in order to overcome or alleviate the drawbacks of the conventional elevation support frame discussed above.

To achieve the above object, the present invention provides a ready-to-stop elevation carrier platform, comprising an inner frame, an outer frame, and the support correction mechanism, wherein the inner frame comprises a plurality of frame bars; the inner frame comprises a first cam plate and a second cam plate arranged symmetric with respect to each other; each of the first cam plate and the second cam plate is provided with concave sections respectively at upper and lower portions thereof and each of the first cam plate and the second cam plate is provided with a convex section at a middle portion so that the first cam plate and the second cam plate are each of a curved form; and a left side and a right side of the inner frame are each provided with a positioning channel and the left and right sides of the inner frame are each provided with a track roller rotatably mounted to a lower end of an outside surface of each of the left and right sides;

the outer frame comprises a plurality of frame bars; the outer frame is arranged outside the inner frame; the outer frame comprises two primary support springs mounted therein; the two primary support springs have top ends rotatably connected to a top side of the inner frame; a left side and a right side of the outer frame are each provided with a track roller rotatably mounted to an upper end of an inside surface of each of the left and right sides; the track rollers are respectively received in the positioning channels of the inner frame and are set in abutting engagement with walls of the positioning channels provided in the inner frame; the left side and the right side of the outer frame are each provided with a positioning channel, such that the positioning channels respectively receive the track rollers of the inner frame therein with the track rollers of the inner frame in abutting engagement with walls of the positioning channels provided in the outer frame and the outer frame is slidable up and down in a vertical direction along outside surfaces of the inner frame; and, a frame bar of a bottom side of the outer frame is provided with a support tie bar attached thereto; and the support correction mechanism comprises a spring seat; the spring seat is provided thereon with two secondary support springs; the two secondary support springs have top ends rotatably connected to the top side of the inner frame such that the support correction mechanism is received inside the inner frame and arranged between the first cam plate and the second cam plate of the inner frame; the spring seat receives a first connection bar and a second connection bar rotatably connected thereto; the first connection bar has a top end rotatably connected to a third connection bar and the second connection bar has a top end rotatably connected to a fourth connection bar with top ends of the third connection bar and the fourth connection bar rotatably connected to each other such that the first connection bar, the second connection bar, the third connection bar, and the fourth connection bar collectively form a four bar linkage, wherein the rotatable connection between the first connection bar and the third connection bar is provided with a first roller and the rotatable connection between the second connection bar and the fourth connection bar is provided with a second roller such that the first roller is in abutting engagement with the first cam plate of the inner frame and the second roller is in abutting engagement with the second cam plate of the inner frame; the spring seat receives the support tie bar of the outer frame to extend therethrough and the top ends of the third connection bar and the fourth connection bar are connected to the support tie bar of the outer frame, wherein the support correction mechanism is movable vertically up and down in unison with upward and downward movements of the outer frame in the vertical direction and the first roller and the second roller are respectively set in rolling movement on and along the first cam plate and the second cam plate;

wherein with such a structural arrangement, an elevation carrier platform that has a small size, is easy to operate for ascend and descend, and is ready to stop at any time is provided.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The technical measures, as well as structures thereof, that are adopted to achieve the purposes of the present invention will be described, in details, in the following with reference to an embodiment illustrated in FIGS. 1-7.

Figure 1:
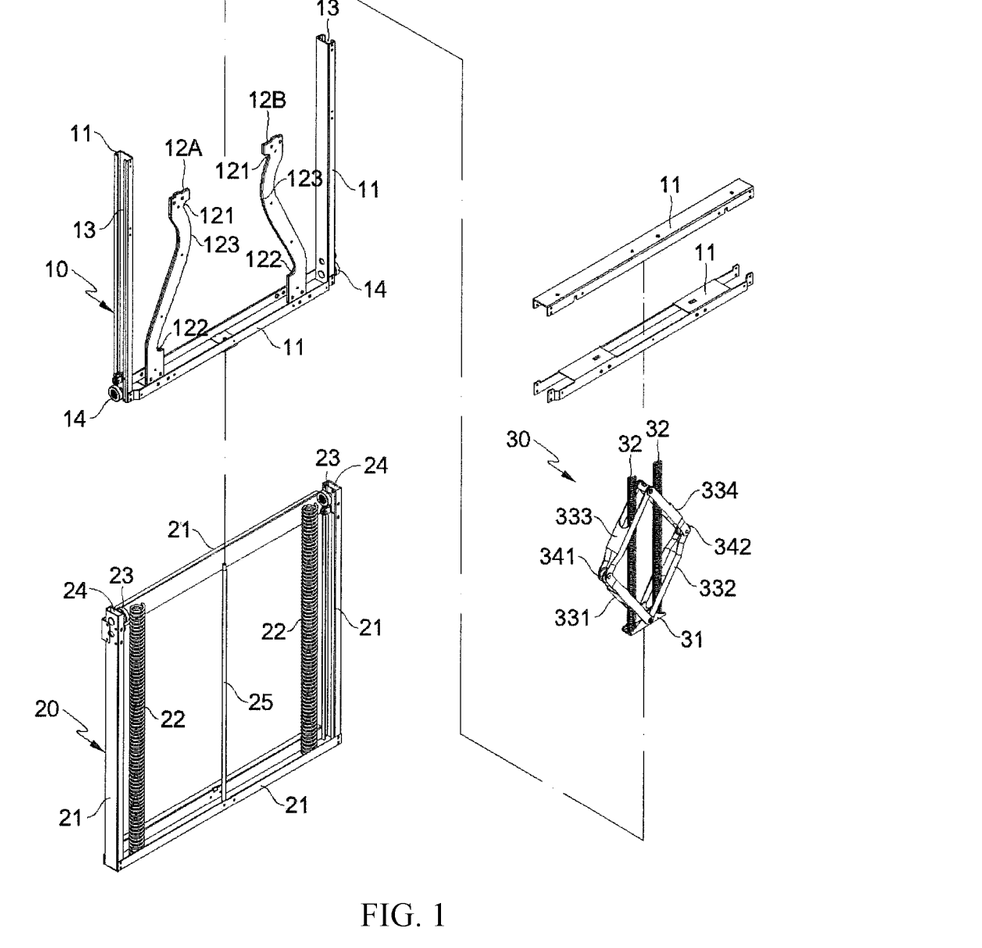
FIG. 1 is an exploded view of the present invention.

As shown in FIG. 1, a ready-to-stop elevation carrier platform according to the embodiment of the present invention comprises an inner frame 10, an outer frame 20, and a support correction mechanism 30.

The inner frame 10 (see FIGS. 2 and 3) comprises a plurality of frame bars 11. The inner frame 10 comprises two cam plates, which are respectively a first cam plate 12A and a second cam plate 12B, arranged symmetric with respect to each other. Each of the first cam plate 12A and the second cam plate 12B is provided with concave sections 121, 122 respectively at upper and lower portions thereof and each of the first cam plate 12A and the second cam plate 12B is provided with a convex section 123 at a middle portion so that the first cam plate 12A and the second cam plate 12B are each of a curved form. Further, the frame bars 11 of two opposite lateral sides (the left side and the right side) of the inner frame 10 are each provided with a positioning channel 13, and the left and right sides of the inner frame 10 are each provided with a track roller 14 rotatably mounted to a lower end of an outside surface of each of the left and right sides.

The outer frame 20 (see FIGS. 2 and 3) comprises a plurality of frame bars 21. The outer frame 20 is arranged outside the inner frame 10. The outer frame 20 comprises two primary support springs 22 mounted therein. The two primary support springs 22 have top ends rotatably connected to a top side of the inner frame 10. Further, the frame bars 21 of two opposite lateral sides (the left side and the right side) of the outer frame 20 are each provided with a track roller 23 rotatably mounted to an upper end of an inside surface of each of the left and right sides. The track rollers 23 are respectively received in the positioning channels 13 of the inner frame 10 and are set in abutting engagement with walls of the positioning channels 13 provided in the inner frame 10; and, the left side and the right side of the outer frame 20 are each provided with a positioning channel 24, such that the positioning channels 24 respectively receive the track rollers 14 of the inner frame 10 therein with the track rollers 14 of the inner frame 10 in abutting engagement with walls of the positioning channels 24 provided in the outer frame 20, whereby the outer frame 20 is slidable up and down in a vertical direction along outside surfaces of the inner frame 10. Further, the frame bar 21 of a bottom side of the outer frame 20 is provided with a support tie bar 25 rotatably attached thereto.

The support correction mechanism 30 (see FIGS. 2 and 3) comprises a spring seat 31. The spring seat 31 is provided thereon with two secondary support springs 32. The two secondary support springs 32 have top ends rotatably connected to the top side of the inner frame 10 such that the support correction mechanism 30 is received inside the inner frame 10 and arranged between the first cam plate 12A and the second cam plate 12B of the inner frame 10. Further, the spring seat 31 receives a first connection bar 331 and a second connection bar 332 rotatably connected thereto. The first connection bar 331 has a top end rotatably connected to a third connection bar 333, and the second connection bar 332 has a top end rotatably connected to a fourth connection bar 334 with top ends of the third connection bar 333 and the fourth connection bar 334 rotatably connected to each other such that the first connection bar 331, the second connection bar 332, the third connection bar 333, and the fourth connection bar 334 collectively form a four bar linkage, wherein the rotatable connection between the first connection bar 331 and the third connection bar 333 is provided with a first roller 341 and the rotatable connection between the second connection bar 332 and the fourth connection bar 334 is provided with a second roller 342 such that the first roller 341 is in abutting engagement with the first cam plate 12A of the inner frame 10 and the second roller 342 is in abutting engagement with the second cam plate 12B of the inner frame 10. Further, the spring seat 31 is structured to receive the support tie bar 25 of the outer frame 20 to extend therethrough and the third connection bar 333 and the fourth connection bar 334 are connected to a top end of the support tie bar 25 of the outer frame 20, wherein the support correction mechanism 30 is movable vertically up and down in unison with upward and downward movements of the outer frame 20 in the vertical direction and the first roller 341 and the second roller 342 are respectively set in rolling movement on and along the first cam plate 12A and the second cam plate 12B.

Figure 2:
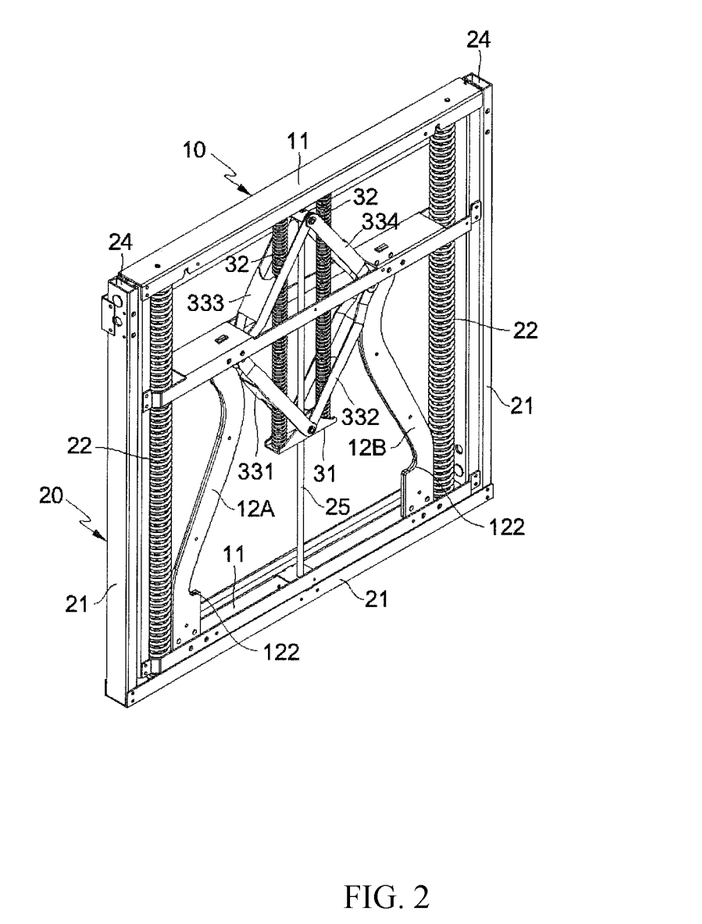
FIG. 2 is a perspective view of the present invention in an assembled form.
Figure 3:
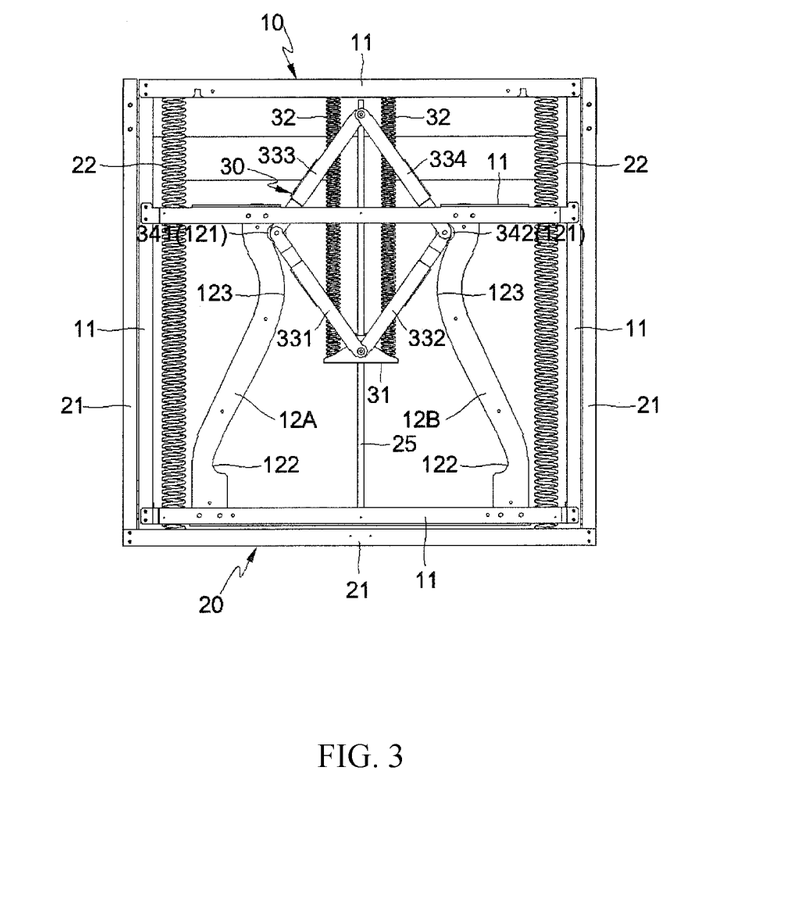
FIG. 3 is a front view of the present invention.

With the above structural arrangement, as shown in FIGS. 2 and 3, since the outer frame 20 is arranged to surround outside the inner frame 10 and since the positioning rollers 14 of the inner frame 10 are received in the positioning channels 24 of the outer frame 20 and the track rollers 23 of the outer frame 20 are received in the positioning channels 13 of the inner frame 10, the inner frame 10 and the outer frame 20 are coupled to and in mutual engagement with each other and are positionable with respect to each other whereby the outer frame 20 is movable up and down in a linear manner along outside surfaces of the inner frame 10. A user may have a display device (not shown) mounted to the outer frame 20 to allow the display device and the outer frame 20 to move synchronously and in unison with each other according to an operation conducted by the user.

Figure 4:
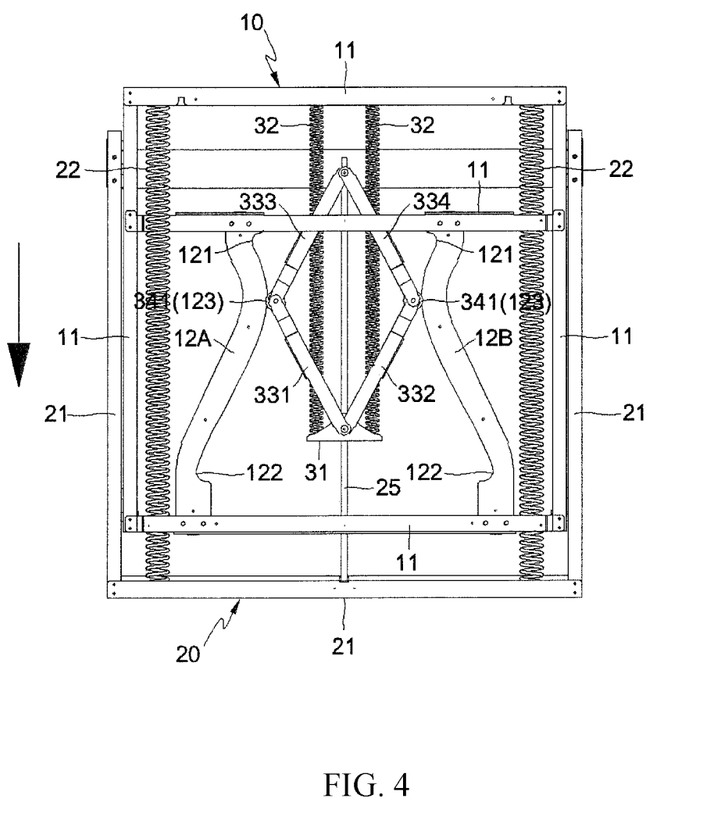
FIG. 4 is a front view of the present invention, illustrating an outer frame moving downward.
Figure 5:
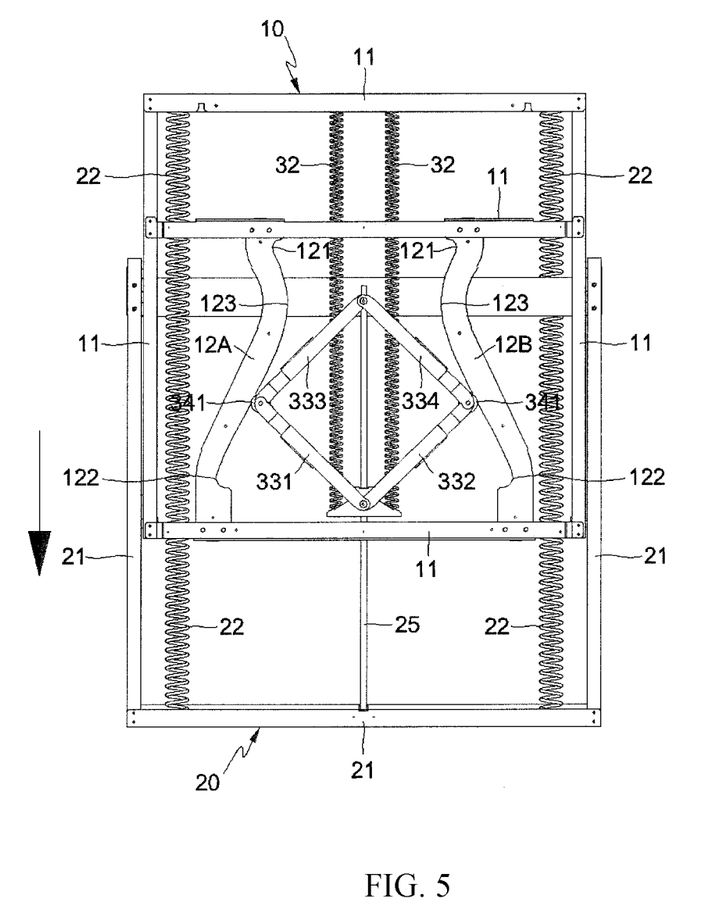
FIG. 5 is another front view of the present invention, illustrating the outer frame moving downward.
Figure 6:
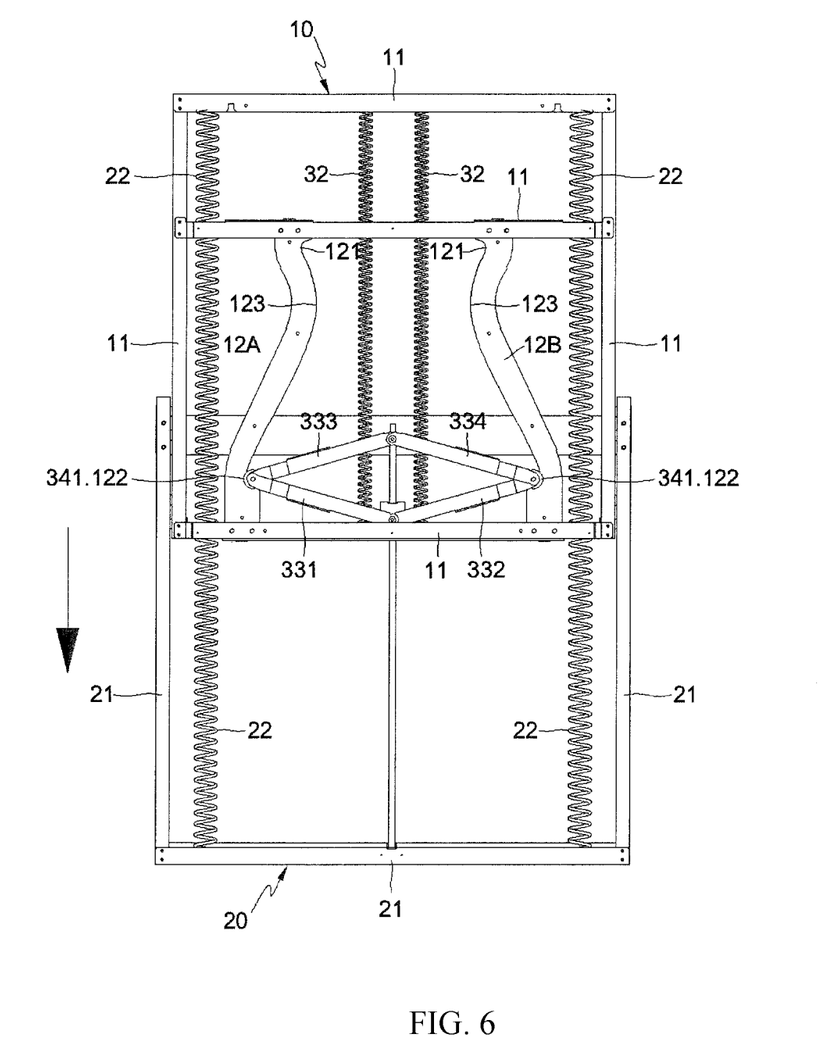
FIG. 6 is a front view of the present invention, illustrating the outer frame moving downward and reaching a lowest position.
Figure 7:
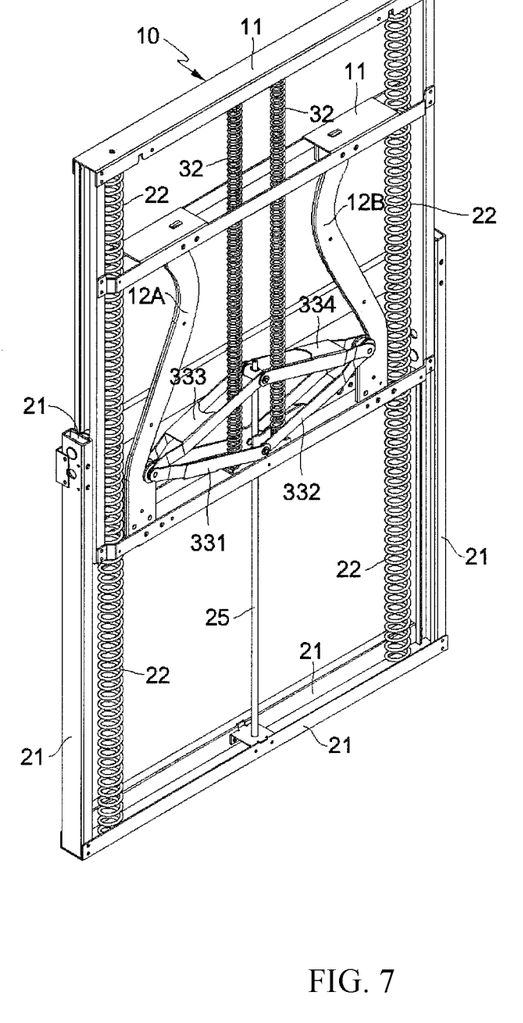
FIG. 7 is a perspective view of the present invention, illustrating the outer frame moving downward to the lowest position.

When the outer frame 20 is at a highest position (as shown in FIGS. 2 and 3), the first roller 341 and the second roller 342 of the support correction mechanism 30 are respectively located at a position in the concave sections 121 of the upper portions of the first cam plate 12A and the second cam plate 12B. When the outer frame 20 is moved downward, since the support correction mechanism 30 is rotatably connected to the support tie bar 25 of the outer frame 20, the spring seat 31, the first connection bar 331, the second connection bar 332, the third connection bar 333, and the fourth connection bar 334 of the support correction mechanism 30 are all synchronously moved downward in unison with the outer frame 20 such that the primary support springs 22 and the secondary support springs 32 are stretched simultaneously and the first roller 341 and the second roller 342 of the support correction mechanism 30 respectively roll downward along the first cam plate 12A and the second cam plate 12B of the inner frame 10 (as shown in FIGS. 4 and 5), whereby the outer frame 20 is movable downward in a stepless manner. When the outer frame 20 reaches a predetermined vertical location or height, the spring forces of the primary support springs 22 and the secondary support springs 32 induced by stretching would make the outer frame 20 stop at any desired moment without additional downward movement and thus, the outer frame 20 and the display device are allowed to stop in a stepless manner. As shown in FIGS. 6 and 7, when the outer frame 20 is moved downward to reach a lowest position, the first roller 341 and the second roller 342 of the support correction mechanism 30 respectively slide into the concave sections 122 of the lower portions of the first cam plate 12A and the second cam plate 12B such that the first roller 341 and the second roller 342 are positioned and held in position to prevent the outer frame 20 from moving further downward even receiving an external force acting thereon.

When the outer frame 20 is moved upward, the spring seat 31, the first connection bar 331, the second connection bar 332, the third connection bar 333, and the fourth connection bar 334 of the support correction mechanism 30 are all synchronously moved upward in unison with the outer frame 20 and the first roller 341 and the second roller 342 of the support correction mechanism 30 respectively rolls upward along the first cam plate 12A and the second cam plate 12B of the inner frame 10 thereby allowing the outer frame 20 to move upward in a stepless manner. When the outer frame 20 reaches a predetermined vertical location or height, the spring forces of the primary support springs 22 and the secondary support springs 32 induced by stretching would make the outer frame 20 stop at any desired moment without additional upward movement and thus, the outer frame 20 and the display device are allowed to stop in a stepless manner. When the outer frame 20 is moved upward to reach the highest position, the first roller 341 and the second roller 342 of the support correction mechanism 30 respectively slide into the concave sections 121 of the upper portions of the first cam plate 12A and the second cam plate 12B such that the first roller 331 and the second roller 332 are positioned and held in position to prevent the outer frame 20 from moving further upward even receiving an external force acting thereon (as shown in FIG. 3).

When the first connection bar 331, the second connection bar 332, the third connection bar 333, and the fourth connection bar 334 of the support correction mechanism 30 are acted upon by an external force to move downward (or upward) and induce a stretching force in the secondary support springs 32. The stretching force generates a horizontal acting force that acts on the first roller 341 and the second roller 342. The horizontal acting force is further converted into a vertical acting force and the vertical acting force provides a force balance condition with respect to the display device loaded on the primary support springs 22 and the outer frame 20 so that the outer frame 20 and the display device can be stopped at any moment in a stepless manner.

Further, since the first cam plate 12A and the second cam plate 12B of the inner frame 10 are of a curved form having a continuous curved surface, when the first roller 341 and the second roller 342 are rolling on the first cam plate 12A and the second cam plate 12B, the first connection bar 331, the second connection bar 332, the third connection bar 333, and the fourth connection bar 334 synchronously change included angles thereof so as to change the horizontal acting force and the vertical acting force that the first connection bar 331, the second connection bar 332, the third connection bar 333, and the fourth connection bar 334 apply to the first roller 341 and the second roller 342 to correspond to an acting force generated by the primary support springs 22, making the outer frame 20, the support correction mechanism 30, and the display device form a force balance condition at any time and may stop at any moment in a stepless manner.

Thus, it can be appreciated from the above description and the drawings that the present invention provides the following advantages:

(1) The present invention comprises a support correction mechanism 30 having a four bar linkage rotatably coupled to a first roller 341 and a second roller 342 to allow the first roller 341, the second roller 342 to slide on and along a first cam plate 12A and a second cam plate 12B. This provides the four bar linkage and the first roller 341 and the second roller 342 with a stepless movement, and thus allowing an outer frame 20 and a display device (not shown in the drawings) to move up and down in a vertical direction to a predetermined height or vertical location in a stepless manner thereby helping improve operation convenience of the present invention.

(2) The present invention comprises an inner frame 10 in which a first cam plate 12A and a second cam plate 12B are mounted and also comprises a support correction mechanism 30 arranged between the first cam plate 12A and the second cam plate 12B so that a first roller 341 and a second roller 342 of the support correction mechanism 30 are allowed to roll on and along the first cam plate 12A and the second cam plate 12B. This helps reduce the overall thickness and size of the carrier platform according to the present invention, allowing the present invention to be rotatably mounted to a wall or rotatably coupled to a stand and also allowing installation thereof to be done with a single operator, thereby providing high utilization and convenience and easiness of installation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A ready-to-stop elevation carrier platform, comprising an inner frame, an outer frame, and the support correction mechanism, wherein the inner frame comprises a plurality of frame bars; the inner frame comprises a first cam plate and a second cam plate arranged symmetric with respect to each other; each of the first cam plate and the second cam plate is provided with concave sections respectively at upper and lower portions thereof and each of the first cam plate and the second cam plate is provided with a convex section at a middle portion so that the first cam plate and the second cam plate are each of a curved form; and a left side and a right side of the inner frame are each provided with a positioning channel and the left and right sides of the inner frame are each provided with a track roller rotatably mounted to a lower end of an outside surface of each of the left and right sides;

the outer frame comprises a plurality of frame bars; the outer frame is arranged outside the inner frame; the outer frame comprises two primary support springs mounted therein; the two primary support springs have top ends rotatably connected to a top side of the inner frame; a left side and a right side of the outer frame are each provided with a track roller rotatably mounted to an upper end of an inside surface of each of the left and right sides; the track rollers are respectively received in the positioning channels of the inner frame and are set in abutting engagement with walls of the positioning channels provided in the inner frame; the left side and the right side of the outer frame are each provided with a positioning channel, such that the positioning channels respectively receive the track rollers of the inner frame therein with the track rollers of the inner frame in abutting engagement with walls of the positioning channels provided in the outer frame and the outer frame is slidable up and down in a vertical direction along outside surfaces of the inner frame; and, a frame bar of a bottom side of the outer frame is provided with a support tie bar attached thereto; and the support correction mechanism comprises a spring seat; the spring seat is provided thereon with two secondary support springs; the two secondary support springs have top ends rotatably connected to the top side of the inner frame such that the support correction mechanism is received inside the inner frame and arranged between the first cam plate and the second cam plate of the inner frame; the spring seat receives a first connection bar and a second connection bar rotatably connected thereto; the first connection bar has a top end rotatably connected to a third connection bar and the second connection bar has a top end rotatably connected to a fourth connection bar with top ends of the third connection bar and the fourth connection bar rotatably connected to each other such that the first connection bar, the second connection bar, the third connection bar, and the fourth connection bar collectively form a four bar linkage, wherein the rotatable connection between the first connection bar and the third connection bar is provided with a first roller and the rotatable connection between the second connection bar and the fourth connection bar is provided with a second roller such that the first roller is in abutting engagement with the first cam plate of the inner frame and the second roller is in abutting engagement with the second cam plate of the inner frame; the spring seat receives the support tie bar of the outer frame to extend therethrough and the top ends of the third connection bar and the fourth connection bar are connected to the support tie bar of the outer frame, wherein the support correction mechanism is movable vertically up and down in unison with upward and downward movements of the outer frame in the vertical direction and the first roller and the second roller are respectively set in rolling movement on and along the first cam plate and the second cam plate.

* * * * *